US008516100B1

(12) United States Patent
Oliver

(10) Patent No.: US 8,516,100 B1
(45) Date of Patent: Aug. 20, 2013

(54) METHOD AND APPARATUS FOR DETECTING SYSTEM MESSAGE MISREPRESENTATION USING A KEYWORD ANALYSIS

(75) Inventor: Ian James Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 295 days.

(21) Appl. No.: 12/700,543

(22) Filed: Feb. 4, 2010

(51) Int. Cl.
*G06F 15/173* (2006.01)

(52) U.S. Cl.
USPC ............. 709/223; 709/203; 709/224; 726/22

(58) Field of Classification Search
USPC ........... 709/223, 224, 225, 229, 203; 726/12, 726/22, 23, 24, 25, 27; 713/201
See application file for complete search history.

(56) References Cited

U.S. PATENT DOCUMENTS

| | | | | |
|---|---|---|---|---|
| 6,704,873 B1* | 3/2004 | Underwood | ...................... | 726/12 |
| 7,822,720 B2* | 10/2010 | Choi et al. | ...................... | 707/688 |
| 7,836,133 B2* | 11/2010 | Quinlan et al. | ............... | 709/206 |
| 7,854,007 B2* | 12/2010 | Sprosts et al. | .................. | 726/24 |
| 7,984,500 B1* | 7/2011 | Khanna et al. | .................. | 726/22 |
| 8,185,448 B1* | 5/2012 | Myslinski | ..................... | 705/26.1 |
| 8,228,215 B1* | 7/2012 | Runge | .............................. | 341/82 |
| 2004/0064401 A1* | 4/2004 | Palaghita et al. | ............... | 705/38 |
| 2005/0154900 A1* | 7/2005 | Muttik | ........................... | 713/188 |
| 2005/0283609 A1* | 12/2005 | Langford | ....................... | 713/176 |
| 2005/0289649 A1* | 12/2005 | Mitomo et al. | .................. | 726/22 |
| 2006/0068755 A1* | 3/2006 | Shraim et al. | ................... | 455/410 |
| 2007/0010993 A1* | 1/2007 | Bachenko et al. | ................ | 704/9 |
| 2007/0039038 A1* | 2/2007 | Goodman et al. | ................ | 726/2 |
| 2007/0101423 A1* | 5/2007 | Oliver et al. | ..................... | 726/22 |
| 2007/0239546 A1* | 10/2007 | Blum et al. | ....................... | 705/14 |
| 2008/0162202 A1* | 7/2008 | Khanna et al. | ..................... | 705/7 |
| 2008/0256602 A1* | 10/2008 | Pagan | ............................... | 726/3 |
| 2009/0158430 A1* | 6/2009 | Borders | ........................... | 726/23 |
| 2009/0320136 A1* | 12/2009 | Lambert et al. | ................. | 726/25 |
| 2010/0017289 A1* | 1/2010 | Sah et al. | ...................... | 705/14.49 |
| 2011/0289582 A1* | 11/2011 | Kejriwal et al. | ................. | 726/22 |
| 2012/0016906 A1* | 1/2012 | Tang et al. | ..................... | 707/780 |

* cited by examiner

*Primary Examiner* — Lashonda Jacobs
(74) *Attorney, Agent, or Firm* — Wilmer Cutler Pickering Hale and Dorr LLP

(57) ABSTRACT

A method and apparatus for detecting system message misrepresentation using a keyword analysis is described. In one embodiment, the method of using one or more processors for detecting system message misrepresentation in memory by performing a keyword analysis, comprising monitoring visual representation object creation within a user interface, accessing keyword information comprising commonly used text for misrepresenting system messages, examining internet activity using the keyword information to produce an examination result, wherein the internet activity is for the created visual representation objects, identifying deceptive text within at least one of the created visual representation objects based on the examination result and producing indicia of detection as to the deceptive text.

20 Claims, 8 Drawing Sheets

US 8,516,100 B1

METHOD AND APPARATUS FOR DETECTING SYSTEM MESSAGE MISREPRESENTATION USING A KEYWORD ANALYSIS

BACKGROUND OF THE INVENTION

1. Field of the Invention

Embodiments of the present invention generally relate to a computer security system and, more particularly, to a method and apparatus for detecting system message misrepresentation using a keyword analysis.

2. Description of the Related Art

Widespread Internet usage by small to large organizations results in an increase in computer-related attacks. Various malicious software programs (e.g., viruses, Trojan horses, worms and/or the like) cause many of these related computer attacks. These malicious software programs may be transmitted (i.e. downloaded) to a vulnerable computer without user consent and/or knowledge as executable programs, email attachments, multimedia files (e.g., video files, audio files and/or the like), malicious HTML code on web pages and/or the like.

The malicious software programs may exert control over an operating system and modify various files (e.g., system registry entries) and/or settings (e.g., background color, screen saver and/or the like) in order to disrupt normal operation. The malicious software programs may also exploit the user computer for illegitimate purposes. For example, a certain malicious software program may misappropriate sensitive data, such as intellectual property, customer data, medical histories, financial records, purchase orders, legal documents, privileged and/or confidential information, social security numbers, addresses, pictures, documents, contacts and/or the like.

Occasionally, a user may be enticed and/or redirected to a website that hosts such malicious software programs. The user may be enticed by various techniques including an email or a posting on social networking websites (e.g., Orkut, Facebook, MySpace and/or the like) that includes a link to the website. The user may also be enticed through a browser window that misrepresents legitimate computer operations, such as system messages. Such a browser window is made to appear very similar to an operating system dialog box, which normally notifies a computer user as to any computer problems. The browser window further includes text-based portions that deceive the computer user into believing that the browser window is an important system message. After being confronted with the deceptive text and following given instructions, the computer user proceeds to download the malicious software programs, which corrupts critical data and/or cause a system crash or system malfunctioning.

Therefore, there is a need in the art for a method and apparatus for detecting system message misrepresentation using a keyword analysis.

SUMMARY OF THE INVENTION

Embodiments of the present invention generally include a method and apparatus for detecting system message misrepresentation using a keyword analysis. In one embodiment, the method of using one or more processors for detecting system message misrepresentation in memory by performing a keyword analysis comprises monitoring visual representation object creation within a user interface, accessing keyword information comprising commonly used text for misrepresenting system messages, examining internet activity using the keyword information to produce an examination result, wherein the internet activity is for the created visual representation objects, identifying deceptive text within at least one of the created visual representation objects based on the examination result and producing indicia of detection as to the deceptive text.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present invention protect computers from malicious attacks using commonly used keywords for misrepresenting legitimate computer operations. During an attack, a computer user is confronted with deceptive text and may be tricked into downloading malicious software or divulging confidential information (e.g., social security numbers, credit card numbers and/or the like). Various software modules cooperate to identify the deceptive text within graphical images on a user interface and then, mitigate errors and problems that are caused by the deception.

Figure 1:
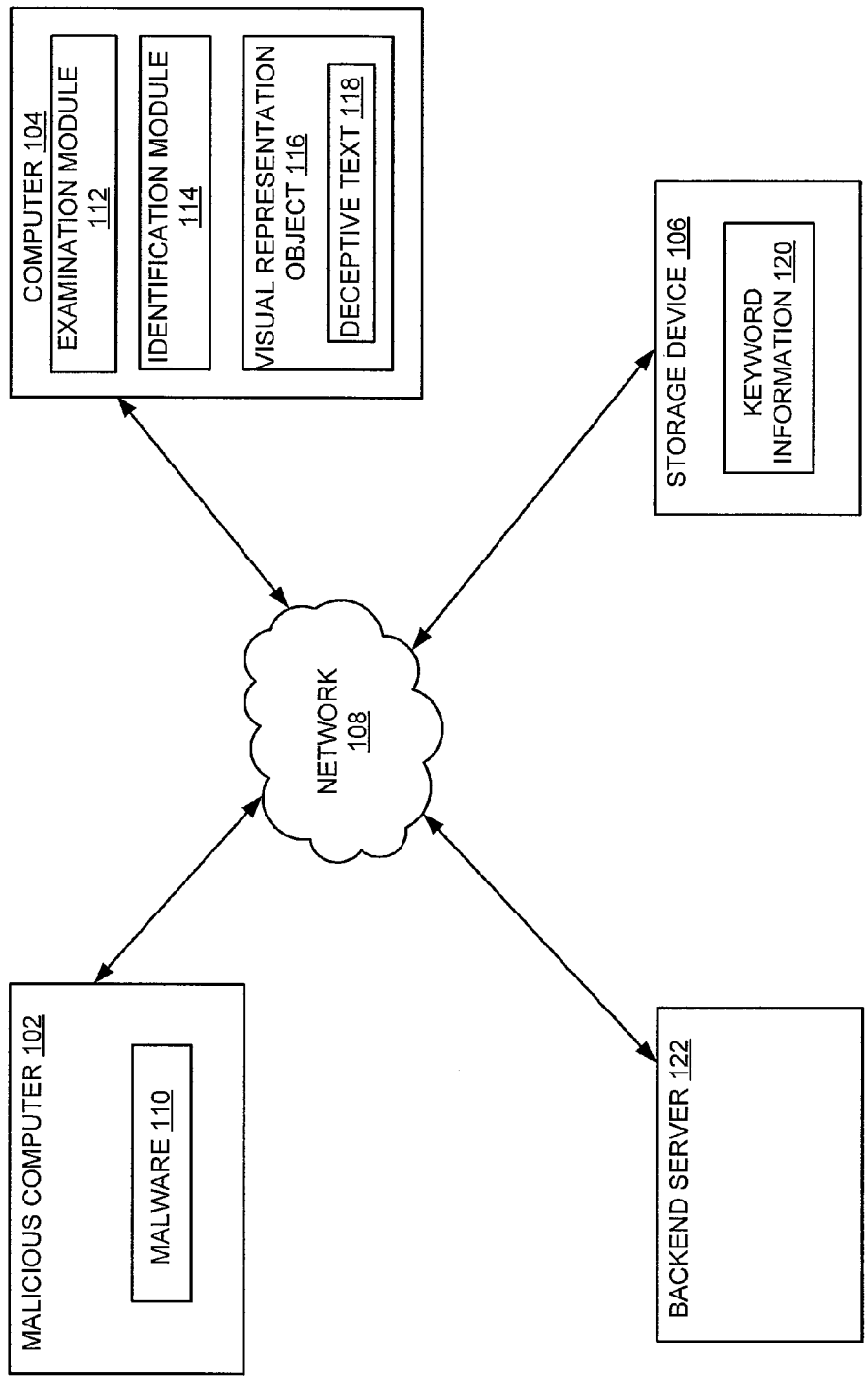
FIG. 1 is a block diagram of a system for detecting legitimate computer operation misrepresentation, according to one or more embodiments.

FIG. 1 is a block diagram of a system 100 for detecting legitimate computer operation misrepresentation, according to one or more embodiments. The system 100 may includes a malicious computer 102, a computer 104 and a storage device 106 where each is coupled to each other through a network 108. The system 100 further includes a backend server 122 that is also coupled to the computer 104 through the network 108.

The malicious computer 102 is a type of computing device (e.g., a laptop, a desktop, a Personal Digital Assistant (PDA) and/or the like), such as those generally known in the art. The malicious computer 102 includes malware 110 having malicious software code that destroys valuable computer data and/or disrupts computer operations. A hacker may utilize the malicious computer 102 to distribute the malware 110 to several computers, such as the user computer 104. As soon as the user computer 104 executes the malicious software code (e.g., spyware, viruses, rootkits and/or the like), the malware 110 compromises computer security by executing malicious software code, which causes critical operation disruption and/or sensitive data misappropriation (e.g., passwords, login names, credit card details and/or the like).

The user computer 104 is a type of computing device (e.g., a laptop, a desktop, a Personal Digital Assistant (PDA) and/or the like) known to one of ordinary skill in the art having the benefit of this disclosure. The user computer 104 includes a comparison module 112 as explained further below. Generally, people utilize the user computer 104 is utilized by the user to access various Internet resources, such as web pages, various content (e.g., dynamic or static content in the form of images, text, video and/or audio), online services (e.g., social networking), applications, databases and/or the like. Such internet activity is monitored and examined in order to determine if a visual representation object 116, such as a browser window, includes deceptive text 118 for misleading a computer user. For example, the deceptive text 118 may entice the computer user into downloading the malware 110 by misrepresenting a legitimate computer operation, such as a fraudulent virus scan that includes a link to download security software as explained in the present disclosure.

The storage device 106 generally includes various components (i.e., hardware and/or software) that are configured to manage storage resources for the system 100. The storage device 106 may include one or more data storage drives (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) for one or more computing devices, such as the computer 104. In one embodiment, the storage device 106 includes one or more database systems, which may maintain various data, such as keyword information 114. As explained further below, the keyword information 114 includes one or more commonly used keywords for misrepresenting legitimate computer operations.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet using various communications infrastructure such as Ethernet, WiFi, WiMax, General Packet Radio Service (GPRS), and the like.

In some embodiments, the backend server 122 is a computing device that is configured to perform various background operations for computers, such as the computer 104. As explained further below, the backed server 122 supports various software modules executed within the computer 104 with reporting and/or analysis functions. In one embodiment, the backed server 122 produces URL (Uniform Resource Locator) chain information 124 indicating each and every Internet site associated with the malware 110. For example, the internet sites may be used by the malicious computer 102 to surreptitiously transmit the malware 110 onto the computer 104. The backend server 122 may also be used to perform a further analysis of the deceptive text 118 as explained further below.

Figure 2:
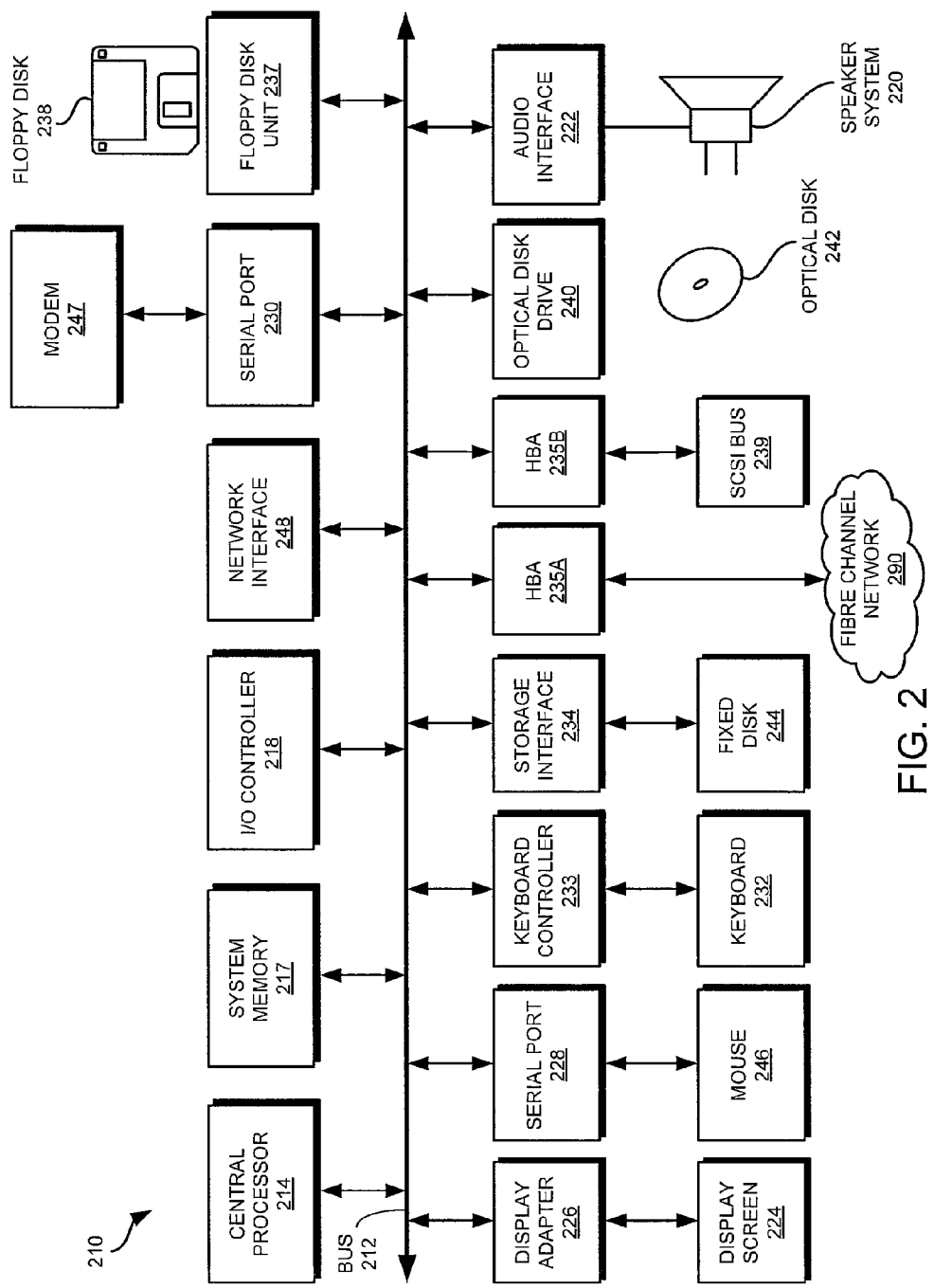
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the attack computer 102 and/or the user computer 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
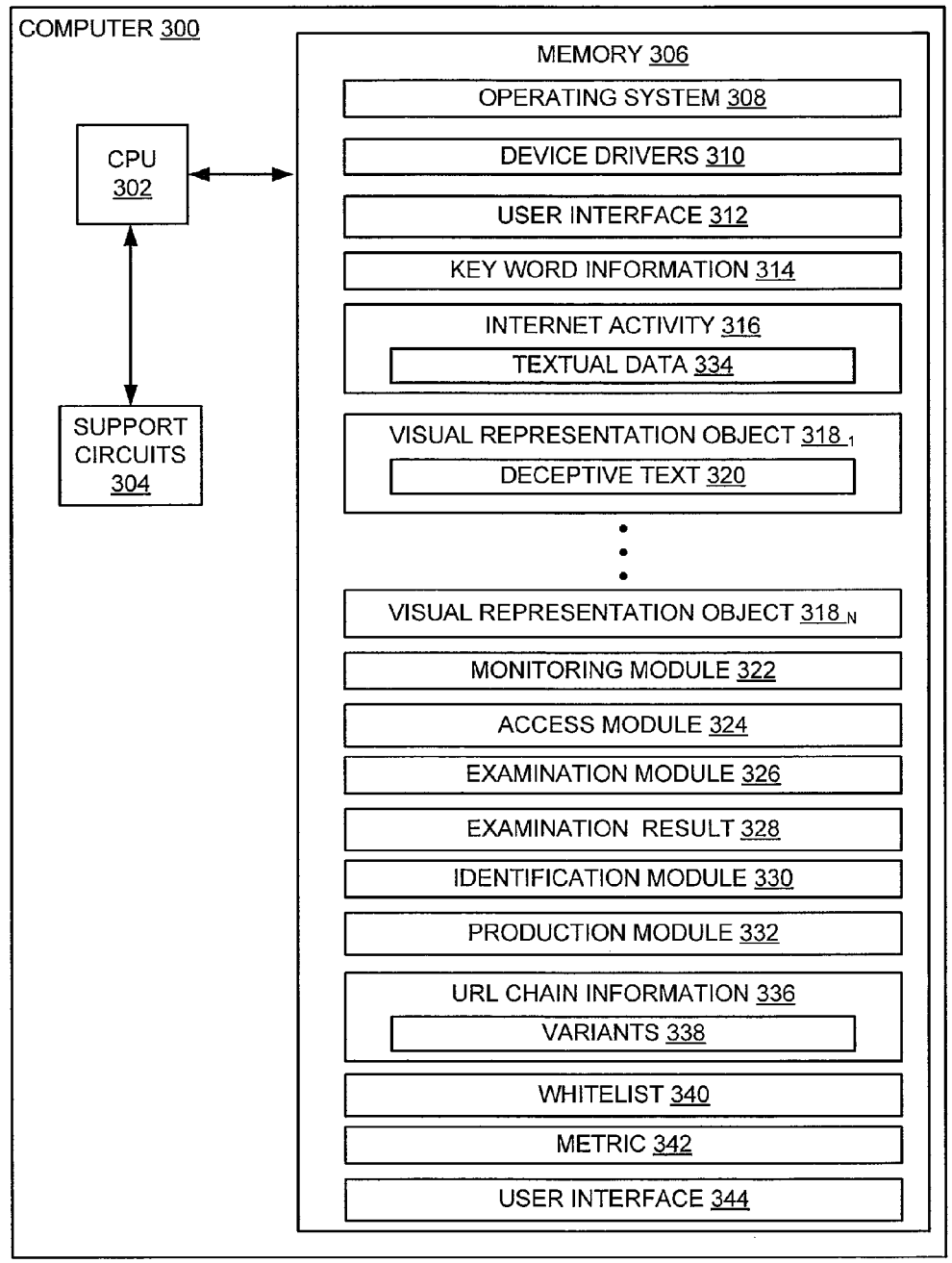
FIG. 3 is a block diagram of a computer for detecting computer operation misrepresentation, according to one or more embodiments.

FIG. 3 is a block diagram of a computer 300 for detecting legitimate computer operation misrepresentation according to various embodiments.

The computer 300 is a type of computing device (e.g., a laptop, a desktop, a Personal Digital Assistant (PDA) and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like.

The memory 306 includes various software packages, such as an operating system 308, one or more device drivers 310, a browser 312, a monitoring module 322, an access module 324, an examination module 326, an identification module 330 and a production module 332. The memory 306 further includes various data, such as keyword information 314, Internet activity 316, an examination result 328, URL chain information 336, a white list 340 and a metric 342. The memory 306 also includes programming threads (i.e., processes) for application software and objects for modeling abstract data that are built and instantiated through the operating system 308.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

According to various embodiments, the browser 312 (e.g., MICROSOFT Internet Explorer (IE), MOZILLA FireFox, GOOGLE Chrome and/or the like) includes software code that facilitates access to various Internet resources such as email, blogs, videos, periodicals, databases, social networking websites and/or the like. The computer 300 may utilize the browser 312 to access such Internet resources. As such, the various Internet resources accessed by the computer user are maintained as the Internet activity 316 as explained further below.

In one embodiment, the Internet activity 316 includes information associated with one or more websites visited by the computer user such as Uniform Resource Locators (URLs), images, text, web documents (i.e., HTML documents), domain names, file names and/or the like. The computer user may regularly access the one or more websites to communicate with other users (e.g., through Instant Messaging (IM) and/or emails), conduct research (e.g., through educational websites, digital libraries and expert discussion forums), perform business applications (e.g., online securities trading and bank account management), for personal entertainment (e.g., downloading playing online videos, or games) and/or the like.

The internet activity 316 includes various web elements that define an appearance, format and contents of the visual representation objects 318, such as HTML elements for a browser window. The internet activity 316 includes textual data 334 for defining text-based portions of the visual representation objects 318. In some embodiments, the textual data 344 includes variables for storing the text-based portions. When the browser 312 processes the textual data 344, one or more words are added to an associated visual representation object 318 as plain text or embedded within graphical images.

According to some embodiments, the keyword information 314 includes commonly used keywords for misrepresenting legitimate computer operations. The commonly used keywords are used to imitate system messages (i.e., operating system dialog boxes and messages) to deceive a computer user. These keywords describe fake alerts for infections by various malicious software programs, such as a spyware, viruses, rootkits and Trojans. The keywords may be applied to the textual data 334 to detect the deceptive text 320 in numerous manners as explained in detail below.

In one embodiment, the keyword information 314 includes phrases that are often employed by hackers to misrepresent legitimate computer operations, such as system messages. The phrases are pre-defined combinations of two or more keywords. By imitating a dialog box on the user interface 344 and presenting a particular phrase, a visual representation object 318 having such a phrase deceives a computer user into believing that the operating system 308 communicated an important system message. These phrases, when matched as whole phrases, have a high accuracy for detecting such misrepresentations, which will result in very few, if any, false positive deceptive text identifications.

In another embodiment, the keyword information 314 includes individual keywords as well as keyword combinations or sub-phrases. Each keyword may be allocated a weight for examining the textual data 344 of the internet activity 316. Each combination of two or more keywords may also be associated with a weight as defined in the metric 342. Each weight represents a frequency of which a particular keyword or keyword combination appears in reported malicious attacks. A weighted value may be computed for two or more keyword matches and stored in the examination result 328. Such a value is compared with pre-defined threshold values for detecting system message misrepresentation. If the value exceeds a particular pre-defined threshold value, the matching keywords are most likely imitating a system message.

If, on the other hand, the value does not exceed any pre-defined threshold, the matching keywords are communicated to a backend server (e.g., the backend server 122 of FIG. 1) for further analysis, according to one or more embodiments. Because of the low value, the matching keywords are most likely not involved in the system message misrepresentation. In one embodiment, however, the matching keywords are actually being used in an imitation dialog box to deceive the computer user. Once verified as the deceptive text 320, weights for the matching keywords are adjusted. Similarly, if the matching keywords are determined to be safe and legitimate, the whitelist 340 is updated to include such keywords.

Alternatively, the keyword information 314 includes primary keywords as well as secondary keywords. If a given keyword or group of keywords is among the primary keywords, the examination module 326 proceeds to examine the secondary keywords. If the given keyword or the group of keywords matches any of the secondary keywords as well, then the given keyword or the group of keywords is most likely being used for misrepresenting a system message to the computer user. The examination module 326 stores the given keyword or the group of keywords as the examination result 328.

Generally, the visual representation component 318 comprises various attributes and software code (e.g., processor-executable instructions) for defining one or more portions of a presentation or browser window on the user interface 344. The portions of the browser window may be employed by a legitimate software application, such as the browser 312, to interact with the computer user or by malicious software code (e.g., the malware 110 of FIG. 1) to disrupt normal computer operation. Hence, each visual representation component 318 may be a discrete user interface (UI) element (e.g., a computer object) that is associated with the functionality of the software application (e.g., process data (e.g., data input), events (e.g., exceptions), actions and/or the like from the user). In one embodiment, the visual representation component 110 may be defined in an implementation of a graphical user interface (GUI) specification that is used by the operation system 308. Accordingly, the software application may access and/or execute the visual representation component 318 through the implementation of the GUI to create an instance of the browser window.

The monitoring module 322 includes software code (e.g., processor-executable instructions) that is stored in the memory 306 and executed by the CPU 302. The monitoring module 322 records the internet activity 316 by capturing images and text that are presented to the computer user through the visual representation objects 318. The monitoring module 322 also stores web documents (e.g., HTML markup data) as well as embedded software code (e.g., JavaScript code) in the internet activity 316. In one embodiment, the monitoring module 322 may be a hooked procedure that is called and executed during each and every variable assignment. When the embedded software code is being executed and text is about to be assigned to a variable, the monitoring module 332 stores a record of such a textual data assignment in the textual data 334. As such, the textual data 334 includes characters or words to which the variables resolve during execution of the embedded software code.

The access module 324 includes software code (e.g., processor-executable instructions) that is stored in the memory 306 and executed by the CPU 302. As explained in the present disclosure, the access module 324 is configured to request the commonly used keywords for misrepresenting system messages from a storage device and store these keywords in the keyword information 314 once received. The access module 324 periodically updates the keyword information 314 with newly discovered deceptive keywords.

The examination module 326 includes software code (e.g., processor-executable instructions) that is stored in the memory 306 and executed by the CPU 302. In one embodiment, the examination module 326 examines the internet activity 316 and produces the examination result 328 after textual data assignments to the memory. The examination module 326 examines the textual data 334 and identifies values that are assigned to variables for defining the text-based portions of the visual representation object 318. Any of these values may include a commonly used keyword of the keyword information 314. These values may also include characters that, when combined, form one or more of the commonly used keywords.

In another embodiment, the examination module 326 examines the internet activity 316 and produces the examination result 328 after the visual representation objects 318 are made visible on the user interface. The visual representation objects 318 can be created (e.g., using a create window function call) and yet remain invisible to the computer user until certain properties are set. The examination module 326 compares the text-based portions of the visual representation objects 318 with the keyword information 314. Once one or more matching keywords are identified, the examination module 326 compares the matching keywords with the metric 342. The examination module 326 stores results from the comparison in the examination result 328.

The identification module 330 includes software code (e.g., processor-executable instructions) that is stored in the memory 306 and executed by the CPU 302. In some embodiments, the identification module 330 determines whether any of the visual representation objects 318 include the deceptive text 320 based on the examination result 328 as explained further below. At this moment, the identification module 330 may instruct the production module 332 to produce indicia of detection as to the deceptive text 320. The indicia of detection may be used to create information for warning the computer user as to the deceptive text 320. The indicia of detection may also be used to launch a process for deleting the deceptive text and/or quarantining software code that created the deceptive text 320.

The production module 332 includes software code (e.g., processor-executable instructions) that is stored in the memory 306 and executed by the CPU 302. The production module 322 may instruct the browser 312 to terminate a browser window that is most likely misrepresenting a system message. In another embodiment, the production module 322 may be instructed to modify the browser window in order to highlight the deceptive text 320.

In some embodiments, the URL chain information 336 refers to a web history associated with the deceptive text 320. For example, the URL chain information 336 includes software code (e.g., JavaScript code) for creating and defining a browser window that displays the deceptive text 320. The URL chain information 336 may also include URLs for one or more web pages that link to a malicious web page that operates the software code. The software code may utilize various methods for deceiving the computer user into believing that the browser window is an important system message. The software code may occasionally modify the deceptive text 320 based on various factors in order to avoid detection. In one embodiment, the software code includes difference implementations or variants 338 of the deceptive text 320.

Each variant 338 may simply be a different arrangement of the words that form that deceptive text 320.

Figure 4:
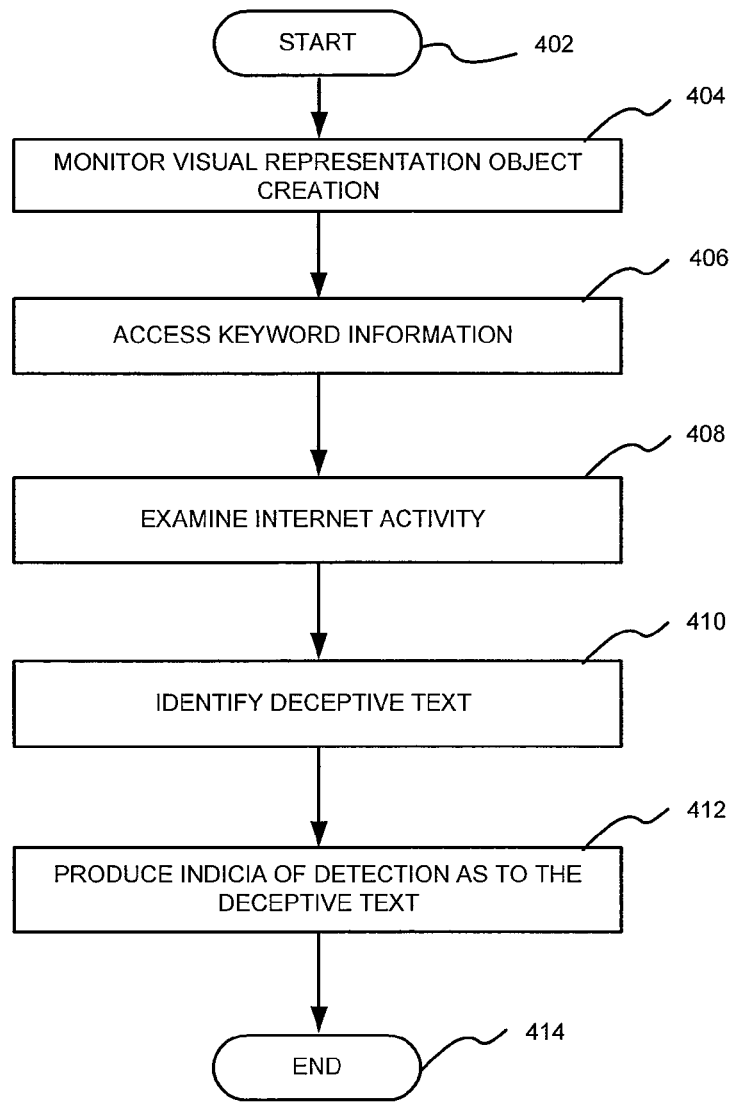
FIG. 4 is a flow diagram of a method for detecting legitimate computer operation misrepresentation, according to one or more embodiments.

FIG. 4 is a flow diagram of a method 400 for detecting legitimate computer operation misrepresentation, according to one or more embodiments.

The method 400 starts at step 402 and proceeds to step 404. At step 404, visual representation object creation is monitored. In some embodiments, a monitoring module (e.g., the monitoring module 322 of FIG. 3) includes software code (e.g., processor-executable instructions) that is stored in memory and executed by one or more processors in order to perform the step 404. For example, the monitoring module detects each new window that is created by a browser (e.g., the browser 312 of FIG. 3). Furthermore, the monitoring module records internet activity (e.g., the internet activity 316 of FIG. 3) associated with the each new browser window. The monitoring module, as an example, captures images and/or text that are transmitted from a network and presented to a computer user through the new browser window. The monitoring module also records textual data (e.g., the textual data 334 of FIG. 3) by monitoring assignments of values (e.g., text, characters and/or the like) to variables that define text-based portions of the new browser window.

At step 406, keyword information is accessed. In some embodiments, an access module (e.g., the access module 324 of FIG. 3) is executed by the one or more processors in order to request the keyword information (e.g., the keyword information 314 of FIG. 3) from a storage device (e.g., the storage device 106 of FIG. 1). The access module communicates with the storage device and receives the keyword information, which is stored in the memory of a computer (e.g., the computer 300 of FIG. 3). As explained in the present disclosure, the keyword information includes commonly used keywords for misrepresenting system messages.

At step 408, the internet activity is examined. In some embodiments, an examination module (e.g., the examination module 326 of FIG. 3) is executed by the processors in order to examine various contents of the created visual representation components, such as plain text and embedded text in images, and extract one or more words. In another embodiment, the examination module monitors textual data assignments in the memory. The examination module, for example, extracts words from resolved variables (e.g., javascript variables) that define the text-based portions of the browser window. The examination module compares these words with the keyword information to identify one or more matching keywords. By assigning weights, the examination module computes a value for the matching keywords, which is stored as an examination result.

At step 410, deceptive text is identified within at least one of the created visual representation components. In some embodiments, an identification module (e.g., the identification module 330 of FIG. 3) is executed by the processors in order to identify keywords being used to misrepresent an important system message to a computer user. In one embodiment, a malicious computer (e.g., the malicious computer 102 of FIG. 1) employs these keywords to entice the computer user into downloading malware (e.g., the malware 110 of FIG. 1). For example, the deceptive text (e.g., the deceptive text 320 of FIG. 3) may describe a fraudulent virus scan being performed on the computer. By confronting the computer user with numerous false infections, the computer user is deceived into downloading the malware and/or purchasing a fraudulent security software subscription.

At step 412, indicia of detection as to the deceptive text is produced. In some embodiments, a production module (e.g., the production module 332 of FIG. 3) is executed by the processors such that the at least one of the created visual representation objects is modified to attenuate the deceptive text. For example, portions having the deceptive text are highlighted to inform the computer user of a potential legitimate computer operation misrepresentation. As another example, information is produced for warning the computer user as to the deceptive text. As such, the computer user is notified that the at least one of the created visual representation objects may be imitating an important system message in which the deceptive text is furthering such an imitation. The examination module, the identification module and the production module cooperate to transform the internet activity and the keyword information into the information for warning the computer user according to one or more embodiments. At step 414, the method 400 ends.

Figure 5:
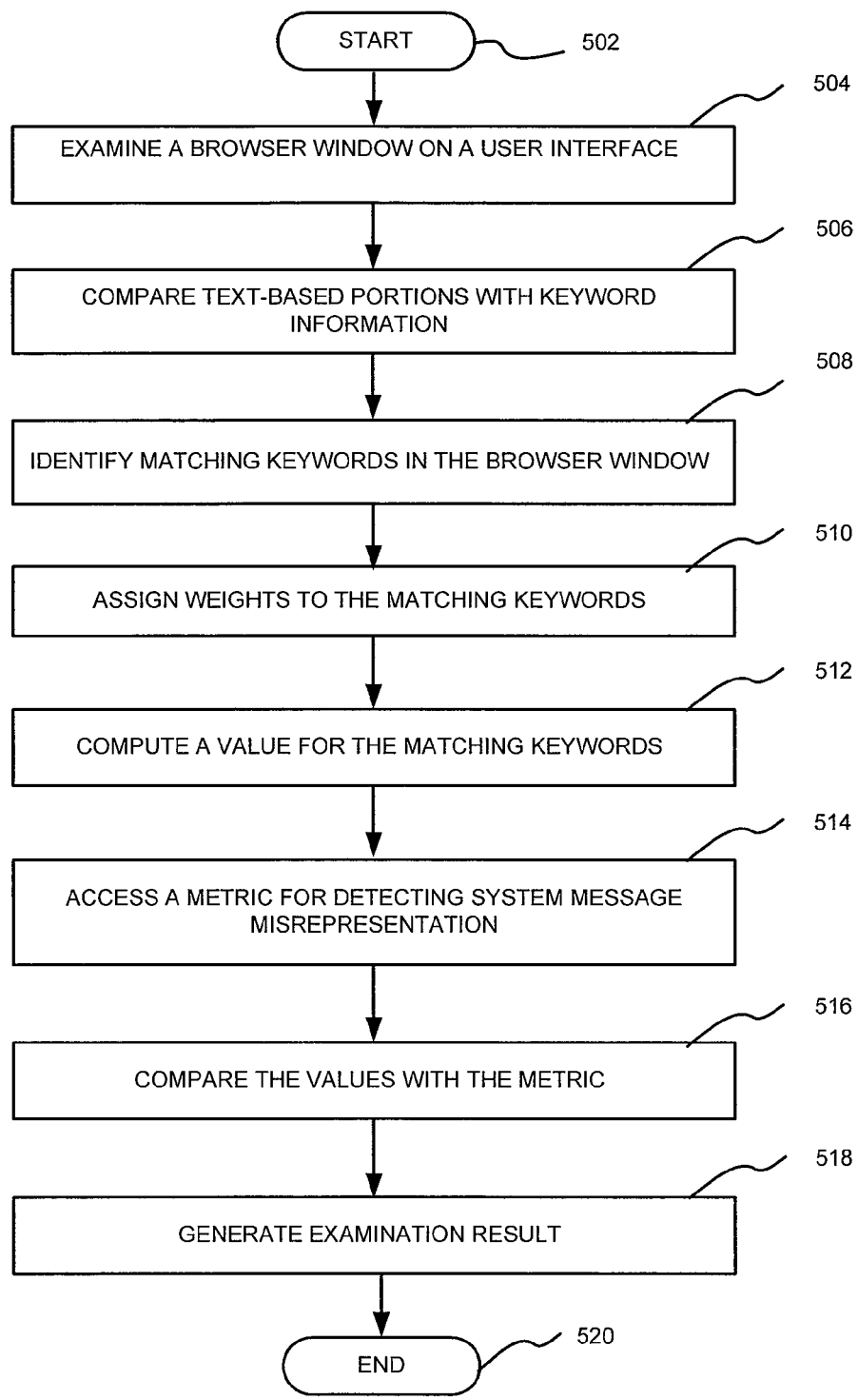
FIG. 5 is a flow diagram of a method for examining internet activity using keyword information according to one or more embodiments.

FIG. 5 is a flow diagram of a method 500 for examining internet activity using keyword information according to one or more embodiments.

The method 500 starts at step 502 and proceeds to step 504. At step 504, a browser window on a user interface is examined. As explained above, the browser window is a visual representation object that is instantiated and presented to a computer user. At step 506, text-based portions of the browser window are compared with keyword information. At step 508, matching keywords are identified. In some embodiments, an examination module compares the text-based portions with each and every commonly used keyword for misrepresenting system messages. For example, the matching keywords may purport to warn the computer user of a fake computer problem (e.g., low memory or a malicious infection).

At step 510, weights are assigned to the matching keywords. At step 512, a value is computed for the matching keywords. In some embodiments, the examination module computes the value by summing each assigned weight. At step 514, a metric for detecting legitimate computer operation misrepresentation is accessed. At 516, the value is compared with the metric. The examination module compares the value with one or more pre-defined threshold values that indicate a likelihood of a system message misrepresentation by the browser window. At step 518, an examination result is generated. The examination module stores information associated with such comparison as the examination result (e.g., the examination result 328 of FIG. 3). At step 520, the method 500 ends.

Figure 6:
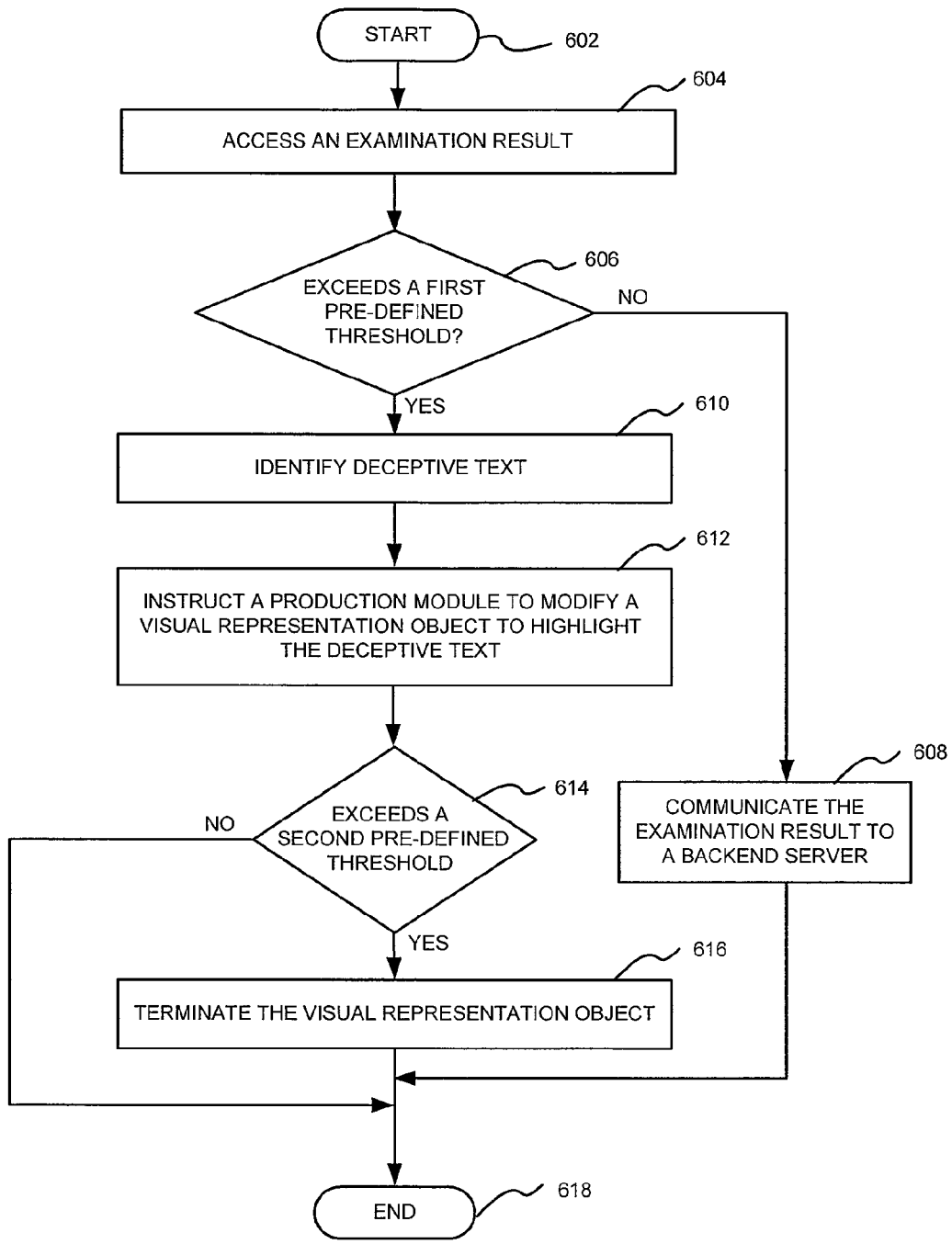
FIG. 6 is a flow diagram of a method for identifying deceptive text based on an examination result according to one or more embodiments.

FIG. 6 is a flow diagram of a method 600 for identifying deceptive text based on an examination result according to one or more embodiments.

At step 604, an examination result is accessed. In some embodiments, the examination result (e.g., the examination result 328 of FIG. 3) includes weighted values for one or more keywords that are presented through a particular visual representation object. These keywords match one or more commonly used keywords for misrepresenting system messages. Furthermore, the examination result includes a comparison between the weighted values and one or more pre-defined threshold values according to a metric for detecting legitimate computer operation misrepresentation. The identification module accesses the examination result from memory.

At step 606, a determination is made as to whether the examination result exceeds a first pre-defined threshold. If the examination result does not exceed the first pre-defined threshold, the method 600 proceeds to step 608. At step 608, the examination result is communicated to a backend server. If, on the other hand, the examination result exceeds the first pre-defined threshold, the method 600 proceeds to step 610. At step 610, the matching keywords are identified as deceptive text. For example, if the weighted value associated with the matching keywords exceeds the first pre-defined threshold, then there is a strong likelihood that the particular visual representation object is being utilized to deceive the computer user since the matching keywords appear often in system message misrepresentations. At step 612, a production module is instructed to modify the particular visual representation object to highlight the deceptive text.

At step 614, a determination is made as to whether the examination result exceeds a second pre-defined threshold. If the examination result does not exceed the second pre-defined threshold, the method 600 proceeds to step 618. If, on the other hand, the examination result exceeds the second pre-defined threshold, the method 600 proceeds to step 616. At step 616, the particular visual representation object is terminated. Alternatively, the browser window is terminated without having the deceptive text highlighted. In one embodiment, the identification module instructs a browser to terminate a browser window having the deceptive text if the weighted value exceeds the second pre-defined threshold. Such a weighted value indicates that the matching keywords are definitely being utilized to misrepresent important system messages. At step 618, the method 600 ends.

Figure 7:
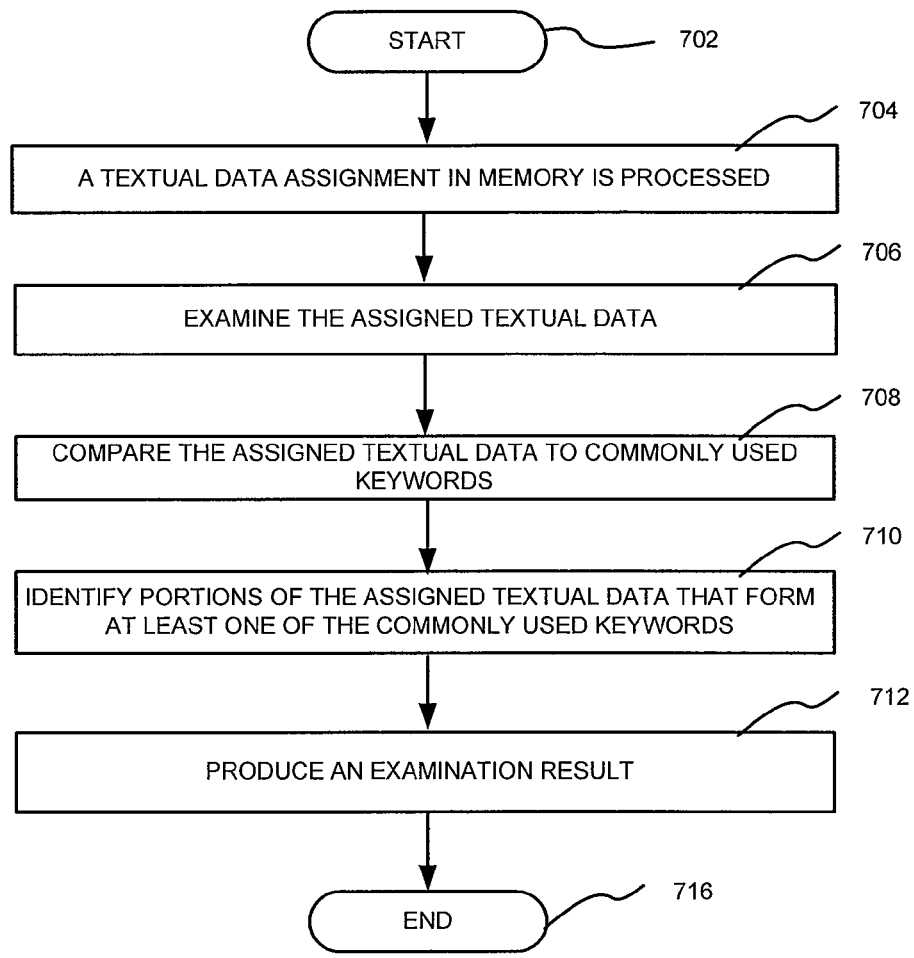
FIG. 7 is a flow diagram of a method for monitoring textual data assignment to portions of memory for the visual representation objects according to one or more embodiments.

FIG. 7 is a flow diagram of a method 700 for monitoring textual data assignment to memory according to one or more embodiments.

The method 700 starts at step 702 and proceeds to step 704. At step 704, a textual data assignment in memory is processed. The textual data (e.g., the textual data 334 of FIG. 3) includes one or more characters or words that are assigned to variables. These variables are utilized in software code (e.g., Javascript code) for creating and defining various text-based portions of a visual representation object, such as a browser window. At step 706, the assigned textual data is examined. In some embodiments, the examination module hooks points during the software code execution at which a value is being assigned to the variables. In another embodiment, the examination module examines a portion of memory where a value (e.g., characters or words) is stored for each and every variable.

At step 708, the assigned textual data is compared with the commonly used keywords for misrepresenting system messages. At 710, portions of the assigned textual data that form at least one of the commonly used keywords are identified. In some embodiments, the examination module identifies one or more words within the assigned textual data that match the at least one of the commonly used keywords. For example, a first variable and a second variable may each reference a portion of a commonly used keyword combination (e.g., words, characters and/or the like). The first variable and the second variable combine to form a third variable. After each portion is assigned to the first variable and the second variable, respectively, the whole keyword combination is assigned to the third variable. In response, the examination module examines a portion in memory for storing a value that is assigned to the third variable and identifies the keyword combination. At step 712, an examination result is produced. Then, the examination module stores the keyword combination in the examination result. At step 714, the method 700 ends.

Figure 8:
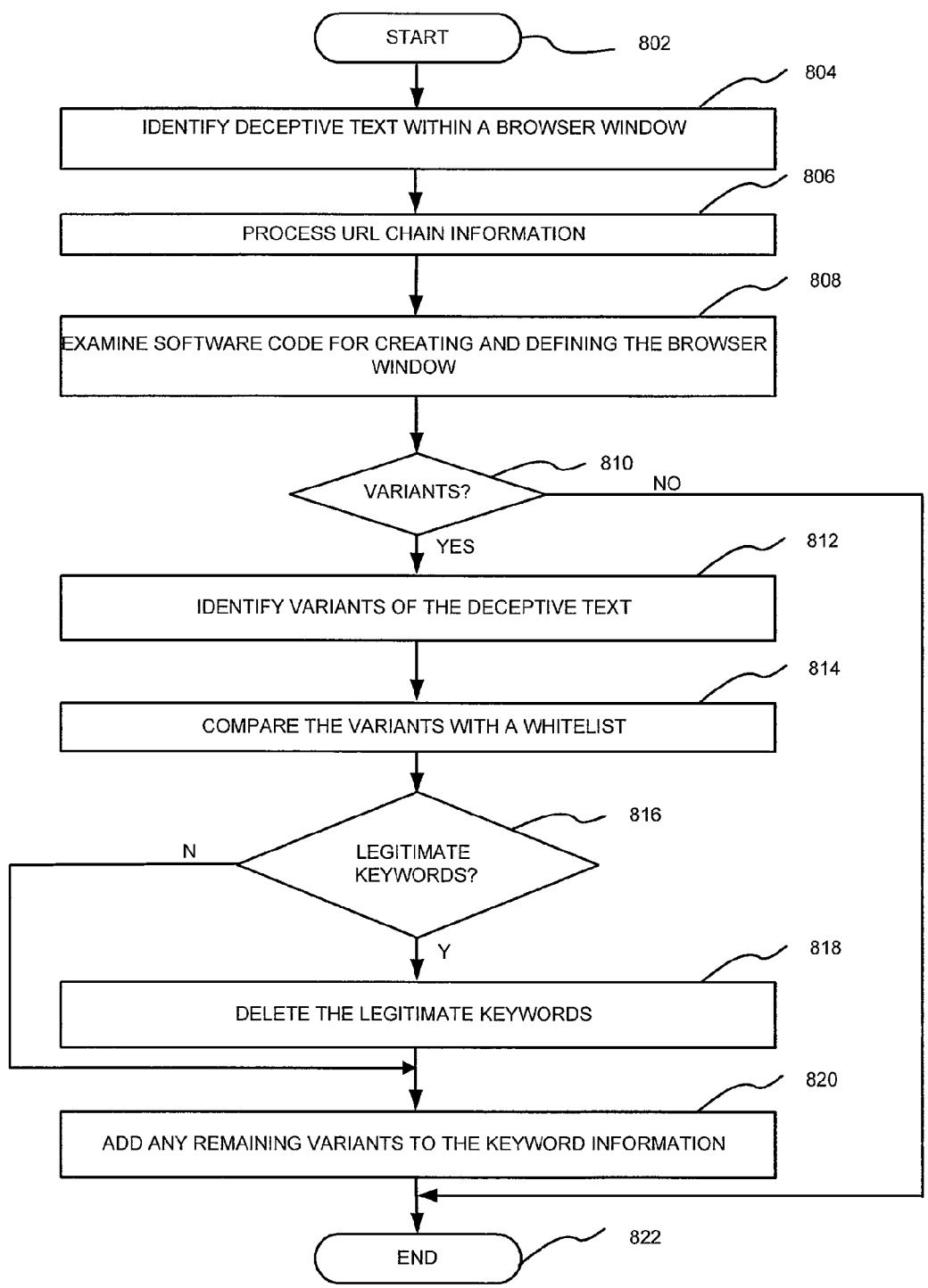
FIG. 8 is a flow diagram of a method for determining variants for deceptive text using URL chain information according to one or more embodiments.

FIG. 8 is a flow diagram of a method 800 for determining variants for deceptive text using URL chain information according to one or more embodiments.

The method 800 starts at step 802 and proceeds to step 804. At step 804, deceptive text within a browser window is identified. At step 806, URL chain information is processed. At step 808, software code for creating and defining the browser window is examined. In some embodiments, an identification module accesses the URL chain information (e.g., the URL chain information 336 of FIG. 3) and extracts URLs for web pages that host the software code. At step 810, a determination is made as to whether there are any variants of the deceptive text. If the software code indicates one or more variants (e.g., the variants 338 of FIG. 3) of the deceptive text, the method 800 proceeds to step 812.

If the software code does not indicate a variant of the deceptive text, the method 800 proceeds to step 822. At step 812, the variants for the deceptive text are identified. At step 814, the variants are compared with a white list. In some embodiments, the white list includes one or more legitimate keywords that are very unlikely to be used for misrepresenting system messages. For example, a variant may include an operating system vendor name even though such a vendor (e.g., MICROSOFT), by itself, is not normally associated system message misrepresentation. Including the operating system vendor name among the commonly used keywords, hence, will result in a high number of false positive detections.

At step 816, a determination is made as to whether the variants include any legitimate keywords as defined in the white list. If the variants do include one or more legitimate keywords, then the method 800 proceeds to step 818. At step 818, the one or more legitimate keywords are deleted from the variants. If the variants do not include any legitimate keywords, then the method 800 proceeds to step 820. At step 820, any remaining keywords are added to the keyword information. At step 822, the method 800 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method of using one or more processors for detecting system message misrepresentation in memory by performing a keyword analysis, comprising:

monitoring, via at least one computer processor, visual representation object creation within a user interface by detecting each new window that is created by a browser;

accessing keyword information comprising commonly used text for misrepresenting system messages;

examining internet activity by parsing created visual representation objects displayed to a user and using the keyword information to produce an examination result, wherein the internet activity is for the created visual representation objects and the examination result comprises a value based upon matching keywords;

identifying deceptive text within at least one of the created visual representation objects based on the examination result; and producing indicia of detection as to the deceptive text.

2. The method of claim 1, wherein producing the indicia further comprises modifying the at least one of the created visual representation objects to highlight the deceptive text.

3. The method of claim 1, wherein the examination result is produced after the visual representation objects are visible to the user.

4. The method of claim 1 further comprising examining URL chain information associated with the deceptive text to identify at least one variant, wherein the at least one variant is added to the keyword information.

5. The method of claim 1, wherein producing the indicia further comprises terminating the at least one of the created visual representation objects.

6. The method of claim 1 further comprising identifying legitimate keywords within the deceptive text based on a white list.

7. The method of claim 1, wherein examining the internet activity further comprising:
monitoring textual data assignment in the memory; and
identifying portions of the assigned textual data that form at least one commonly used keyword for misrepresenting a system message.

8. The method of claim 1, wherein examining the internet activity further comprising:
assigning weights to keywords within the created visual representation objects; and
computing values for portions of textual data.

9. The method of claim 8, wherein the deceptive text having a value that exceeds a pre-defined threshold value according to a metric for detecting the system message misrepresentation.

10. The method of claim 1, wherein identifying the deceptive text further comprises transforming the internet activity and the keyword information into the indicia of detection.

11. An apparatus for using one or more processors for detecting system message misrepresentation in memory by performing a keyword analysis, comprising:
means for monitoring visual representation object creation within a user interface by detecting each new window that is created by a browser;
means for accessing keyword information comprising commonly used text for misrepresenting system messages;
means for examining internet activity by parsing created visual representation objects displayed to a user and using the keyword information to produce an examination result, wherein the internet activity is for the created visual representation objects and the examination result comprises a value based upon matching keywords;
means for identifying deceptive text within at least one of the created visual representation objects based on the examination result; and
means for producing indicia of detection as to the deceptive text.

12. The apparatus of claim 11 further comprising means for modifying the at least one of the created visual representation objects to highlight the deceptive text.

13. The apparatus of claim 11 further comprising means for examining URL chain information associated with the deceptive text to identify at least one variant, wherein the at least one variant is added to the keyword information.

14. The apparatus of claim 11 further comprising means for transforming the internet activity and the keyword information into the indicia of detection.

15. A computer-readable-storage medium comprising one or more processor-executable instructions that, when executed by at least one processor, causes the at least one processor to:
monitor visual representation object creation within a user interface by detecting each new window that is created by a browser;
access keyword information comprising commonly used text for misrepresenting system messages;
examine internet activity by parsing created visual representation objects displayed to a user and using the keyword information to produce an examination result, wherein the internet activity is for the created visual representation objects and the examination result comprises a value based upon matching keywords;
identify deceptive text within at least one of the created visual representation objects based on the examination result; and
produce indicia of detection as to the deceptive text.

16. The computer-readable-storage medium of claim 15 further comprising one or more processor-executable instructions that, when executed by the at least one processor, causes the at least one processor to:
modify the at least one of the created visual representation objects to highlight the deceptive text.

17. The computer-readable-storage medium of claim 15 further comprising one or more processor-executable instructions that, when executed by the at least one processor, causes the at least one processor to:
examine url chain information associated with the deceptive text to identify at least one variant, wherein the at least one variant is added to the keyword information.

18. The computer-readable-storage medium of claim 15 further comprising one or more processor-executable instructions that, when executed by the at least one processor, causes the at least one processor to:
transform the internet activity and the keyword information into the indicia of detection.

19. The computer-readable-storage medium of claim 15 further comprising one or more processor-executable instructions that, when executed by the at least one processor, causes the at least one processor to:
assign weights to keywords within the created visual representation objects; and
compute values for portions of textual data, wherein the deceptive text having a value that exceeds a pre-defined threshold value according to a metric for detecting the system message misrepresentation.

20. The computer-readable-storage medium of claim 15 further comprising one or more processor-executable instructions that, when executed by the at least one processor, causes the at least one processor to:
monitor textual data assignment in a portion of the memory for the created visual representation objects; and identifying portions of the assigned textual data that form the deceptive text.

* * * * *